(12) United States Patent
Vetter et al.

(10) Patent No.: US 9,433,909 B2
(45) Date of Patent: Sep. 6, 2016

(54) APPARATUS FOR RETAINING SOLID MATERIAL IN A RADIAL FLOW REACTOR AND METHOD OF MAKING

(71) Applicant: UOP LLC, Des Plaines, IL (US)

(72) Inventors: Michael J. Vetter, Schaumburg, IL (US); Quan Yuan, Northbrook, IL (US); Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 653 days.

(21) Appl. No.: 13/915,937

(22) Filed: Jun. 12, 2013

(65) Prior Publication Data

US 2013/0343961 A1  Dec. 26, 2013

Related U.S. Application Data

(60) Provisional application No. 61/662,095, filed on Jun. 20, 2012.

(51) Int. Cl.
*B01J 8/02* (2006.01)
*B01D 53/04* (2006.01)
*B01J 8/00* (2006.01)

(52) U.S. Cl.
CPC .......... *B01J 8/0214* (2013.01); *B01D 53/0431* (2013.01); *B01J 8/008* (2013.01); *B01J 8/0257* (2013.01); *B01J 2208/00884* (2013.01)

(58) Field of Classification Search
CPC ................. B01J 8/0214; B01J 8/0257; B01J 2208/00884; B01J 2208/0092; B01J 2208/00938; B01J 2208/00929; B01D 53/0431
See application file for complete search history.

(56) References Cited

U.S. PATENT DOCUMENTS

| | | |
|---|---|---|
| 3,734,677 A | 5/1973 | Murase |
| 4,842,509 A | 6/1989 | Hasenack |
| 5,405,261 A | 4/1995 | Scraggs |
| 7,163,666 B2 | 1/2007 | Barnes |
| 7,193,123 B2 | 3/2007 | Stell |
| 7,226,568 B1 | 6/2007 | Ham |
| 7,438,191 B2 | 10/2008 | Koves |
| 7,757,865 B2 | 7/2010 | Koves |
| 8,071,047 B2 | 12/2011 | Krishnamurthy |
| 8,122,909 B2 | 2/2012 | Tonkovich |
| 8,178,075 B2 | 5/2012 | He |
| 2011/0123412 A1 | 5/2011 | Krishnamurthy |
| 2013/0340229 A1 | 12/2013 | Vetter |

FOREIGN PATENT DOCUMENTS

| | | |
|---|---|---|
| CN | 201006868 Y | 1/2008 |
| EP | 206549 A1 | 12/1986 |

*Primary Examiner* — Lessanework Seifu

(57) ABSTRACT

An apparatus for use in radial flow reactors is presented. The apparatus includes a first partition and a second partition with support members coupled therebetween. The first partition include a first opening and a second opening to allow the passage of fluid therethrough. A baffle extends into a flow channel formed by adjacent support members to obstruct an upper or lower portion of the first opening to interrupt a portion of the fluid flow therethrough.

11 Claims, 4 Drawing Sheets

APPARATUS FOR RETAINING SOLID MATERIAL IN A RADIAL FLOW REACTOR AND METHOD OF MAKING

CROSS REFERENCE TO RELATED APPLICATION

This application claims the benefit of U.S. Provisional Application No. 61/662,095 which was filed on Jun. 20, 2012.

FIELD OF THE INVENTION

This invention relates to cross or radial-flow reactors or adsorbers where a fluid flows across a bed of catalyst or adsorbent. In particular, this relates to the internal components of a reactor or adsorber for distribution flow of the fluid and for providing a device for preventing the flow of catalyst or adsorbent across the inlet or outlet screens.

BACKGROUND OF THE INVENTION

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and that there are annular distribution and collection devices. The devices for distribution and collection typically incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For either a fixed bed or moving bed, the screen or mesh provides a barrier to prevent the loss of solid catalyst particles while allowing fluid to flow through the bed. In a moving bed, solid catalyst particles are added at the top and flow through the apparatus and are removed at the bottom, while passing through a screened-in enclosure that permits the flow of fluid over the catalyst. In a fixed bed, the catalyst, or adsorbent, is loaded into a bed between screens, or other retention devices, and the screens allow fluid to flow over the catalyst while holding the catalyst in place. The screen is preferably constructed of a non-reactive material, but in reality the screen often undergoes some reaction through corrosion and/or erosion, and over time problems arise from the corroded or eroded screen or mesh.

One type of screen is a profile wire screen, where a profile wire is wrapped around supports and set at a predetermined spacing for the wire as it is wrapped around the supports. The screen is then cut and flattened and then re-rolled or re-shaped. The screen is shown in U.S. Pat. No. 2,046,458 and U.S. Pat. No. 4,276,265. When flattened, the screen includes the profile wires, which are typically oriented vertically with support rods attached thereto and extending across the profile wires and orthogonally therefrom. The screen can be used as part of an inlet distribution device, or other device for containing a catalyst. One type of inlet distribution device is a reactor internal having a scallop shape and is described in U.S. Pat. No. 6,224,838 and U.S. Pat. No. 5,366,704. The scallop shape and design provides for good distribution of gas for the inlet of a radial flow reactor, but uses screens or meshes to prevent the passage of solids. The scallop shape is convenient because it allows for easy placement in a reactor without concern regarding the curvature of the vessel wall. The screens or meshes used to hold the catalyst particles within a bed are sized to have apertures sufficiently small that the particles cannot pass through.

In one common approach, profile wire screen(s) are formed into a generally tubular or cylindrical shape extending vertically within the generally vertical annular reactor about a central axis thereof. A perforated plate may be spaced from the profile wires and connected to opposite edges of the support rods on a fluid side of the screen within the reactor, while the profile wires are typically oriented on a material side. The plates are also formed or oriented to into a tubular or cylindrical shape within the reactor. Depending on the type of reactor and where within the reactor the screens are positioned, plates may be closer to the center or the outer walls of the reactor. As mentioned, the plates often include punched or perforated plates having a plurality of openings. The support rods are oriented above and below the openings and provide a channel for fluid to flow from the openings in the plate to the openings or mesh in the profile wire screens to provide good distribution of the fluid to the solid catalyst or adsorbent bed. In one design, the reactor includes a centerpipe that includes an inner annular plate and an outer annular profile wire screen as described. Fluid flows from an inlet through the centerpipe and passes through the plate openings and out of the screen to contact the catalyst.

It has recently been identified that the fluid flowing through the plate openings and channels can cause jetting which, when contacting the screen and the solid material on the opposite side of the screen, may cause vibration of the screen and/or solid material and accelerate corrosion or erosion of the outer surface of the profile wire screen and potentially damage the solid material. This can decrease the life of the equipment and catalyst or adsorbent within the reactor, increasing the cost of maintaining the reactor as well as down time required for changing out internal components of the reactor.

The design of reactors to overcome these limitations can save significantly on downtime for repairs and on the loss of catalyst, which is a significant portion of the cost of processing hydrocarbons.

DETAILED DESCRIPTION OF THE INVENTION

Radial flow reactors often produce harsh chemical environments and severe operating conditions in terms of pressure and temperature which creates tremendous stresses on the screens in these types of reactors. Thermal cycles and the weight of the catalyst can cause buckling of the screens. Stronger screens or devices for retaining catalyst are needed.

Radial flow reactors, and cross-flow systems in general, need screens to contain the catalysts used in the reactors. While the present description is provided in terms of a reactor system, the equipment and processes described herein are applicable to adsorbers, or other equipment used in contacting fluids with solids.

Catalyst chamber internals grids are currently used in olefin production, for example, such as the dehydrogenation of propane to propylene or iso-butane to iso-butylene to support one or more adsorbent beds within the chamber or to separate individual adsorbent beds. The grids currently used are typically manufactured using profile wire construction.

Figure 1:
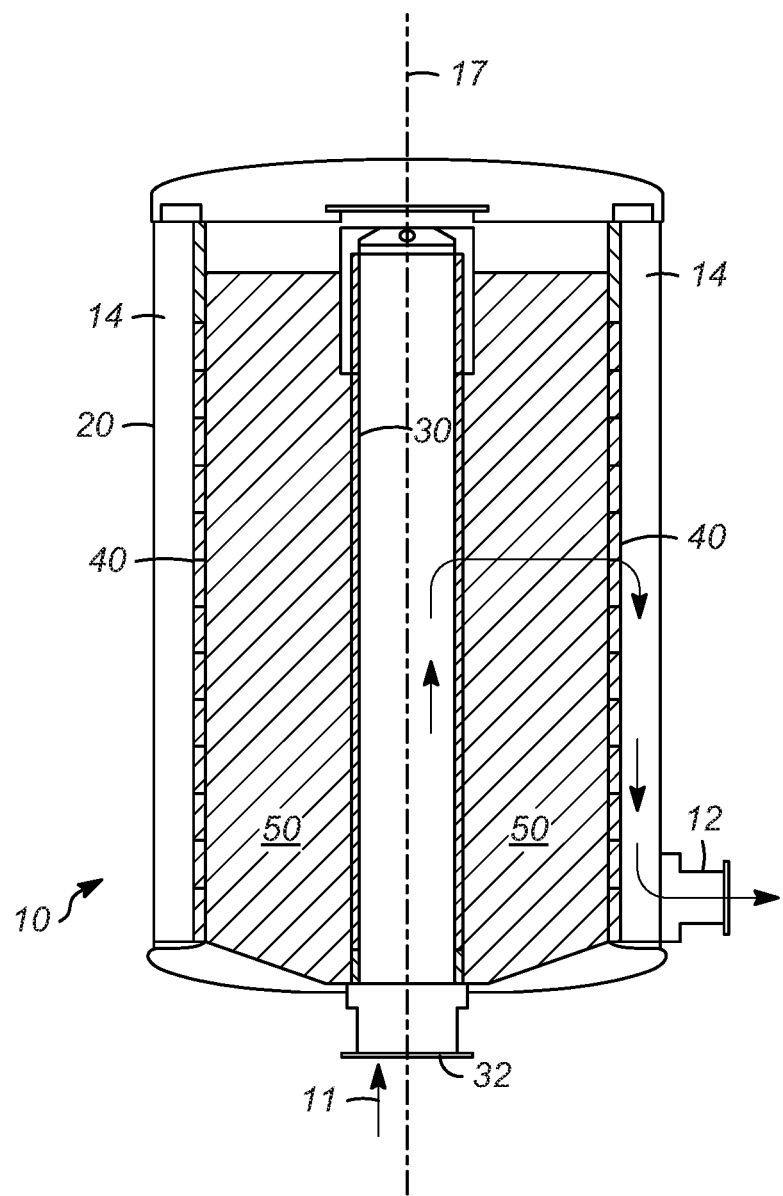
FIG. 1 illustrates a reactor configuration in accordance with various aspects.
Figure 2:
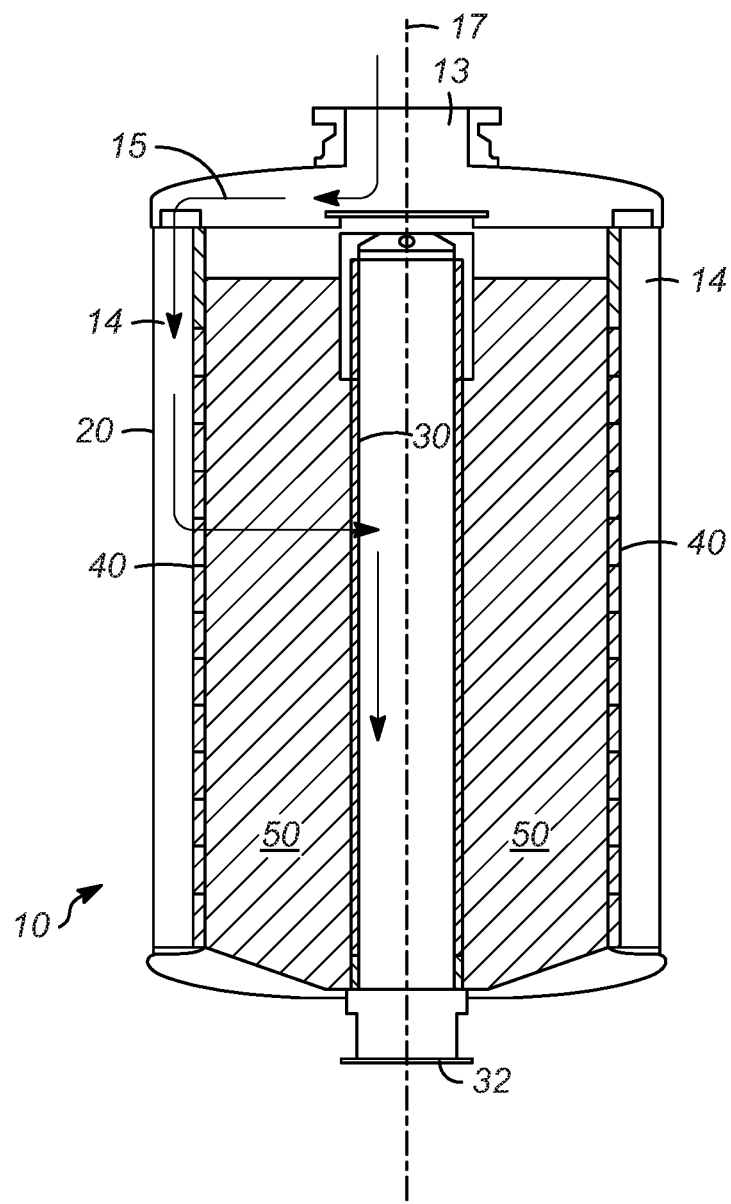
FIG. 2 illustrates a reactor configuration in accordance with various other aspects.

Turning to FIG. 1, a radial flow reactor 10 in accordance with one aspect is illustrated that includes inner and outer annular partitions for supporting an annular bed of solid material therebetween. The reactor 10 includes a reactor shell 20, one partition in the form of a centerpipe 30, an outer partition in the form of screened partition 40, and a solid particle, or catalyst, bed 50. The reactor 10 by one aspect is configured so that fluid enters the reactor 10 through an inlet 32 at the bottom of the reactor and travels upwardly through the centerpipe 30 in the direction indicated by arrow 11. As the fluid flows upwardly, portions of the fluid are directed radially through the centerpipe, into the catalyst bed 50 where the fluid contacts the catalyst and reacts to form a product stream. The product stream flows radially outwardly through the outer screened partition 40 and into annular space 14 between the screened partition 40 and the reactor shell 20. The product stream is collected in the annular space 14 and passes through a reactor outlet 12. According to another aspect illustrated in FIG. 2, the reactor may be configured to have an opposite flow pattern such that fluid enters through an inlet 13 and enters annular space 14 between the reactor shell 20 and the outer screened partition 40 and flows radially inwardly through the catalyst bed 50 where it contacts the catalyst and reacts to form a product stream. The product stream flows radially inwardly through the center pipe 30 where it is collected in the centerpipe and exits through the outlet 32. Other configurations of the reactor 10 and flow are also possible and contemplated herein.

As currently practiced, where the reactor includes a radial outward flow configuration like that shown in FIG. 1, the centerpipe 30 includes an outer catalyst-side profile wire screen and an inner fluid-side perforated plate. The outer partition may also include an inner catalyst-side profile wire screen and/or an outer fluid-side perforated plate. Alternatively, where the reactor includes the radially inward flow configuration of FIG. 2, the outer partition 40 includes an inner catalyst-side profile wire screen and an outer fluid-side perforated plate. The centerpipe 30 may also include an outer catalyst-side profile wire screen and/or inner fluid-side perforated plate. In both of these configurations, the profile wire screen is subject to may stresses and a corrosive environment, including jetting of the fluid thereagainst and vibration of one or both of the profile wire screen and the catalyst against the other, which can result in corrosion and erosion of the profile wire screen and damage to the catalyst.

The partitions 30 and 40 must perform the duty of preventing the passage of solid catalyst particles and allowing the passage of fluid, while providing structural strength to hold the catalyst against the pressure of the weight of the solid particles.

Figure 3:
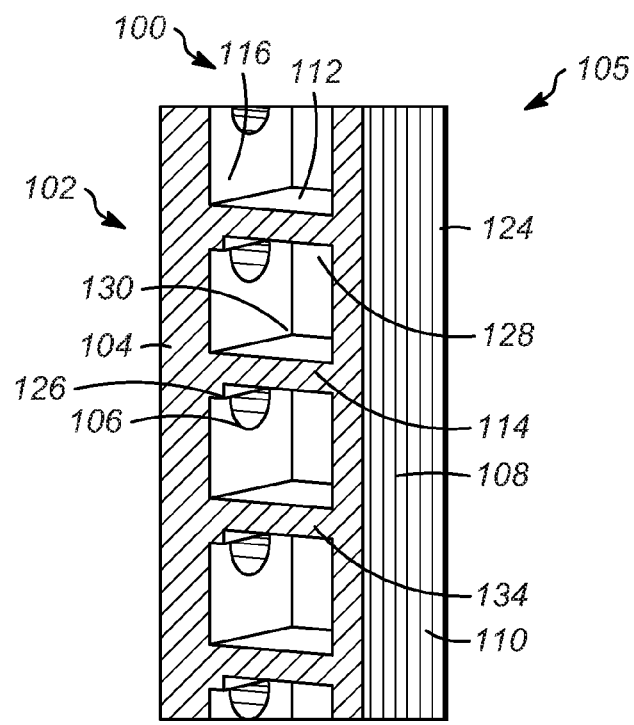
FIG. 3 illustrates a perspective view of a screen for use within a radial flow reactor in accordance with various embodiments.
Figure 4:
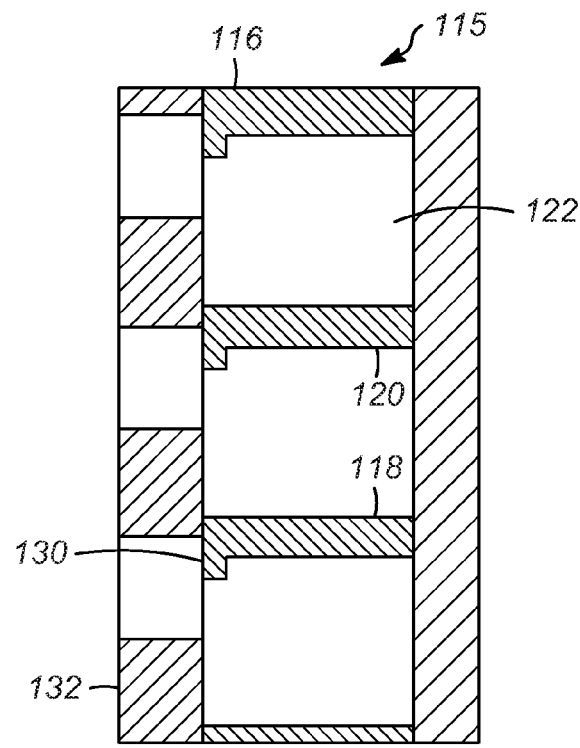
FIG. 4 illustrates a side cross sectional view of the screen of FIG. 2.

In accordance with one aspect, an apparatus for retaining a solid material in the reactor 10 is illustrated in FIGS. 3-4. The apparatus 100 includes a fluid-side partition 102 and a catalyst-side partition 105. As used herein, "fluid side" refers to the side or portion that is closer to the fluid within the reactor, such as closer to fluid flowing through centerpipe 30 or in the annular space 14, while "catalyst side" refers to a side or portion closer to the catalyst bed 50 or other solid material bed within the reactor. As described herein the apparatus may include or form a portion of the centerpipe 30 and/or the outer partition 40. For ease of explanation, the following will be described with regard to an apparatus for use as part of a centerpipe 30 within the outwardly radial flow configuration reactor of FIG. 1, although it should be understood that these principles and this description may be applied to the other reactor designs discussed above. Explanation of a reactor and components as having a cylindrical structure, is intended to include cylindrical structures, but also structures composed of individual planar components that when assembled make a multisided structure, such as having the cross sectional shape of an octagon or dodecagon, or any polygonal shaped cross-section, but can be substantially treated as a cylindrical structure.

By one aspect the fluid-side partition 102 includes a plate 104 having openings 106 therethrough. When positioned in the reactor 10 the plate has an annular form about a center axis 17 of the reactor 10, and may be formed in different manners, including, for example, a single hollow cylindrical plate or tube or a plurality of flat or arcuate plates positioned circumferentially side-by-side about the axis 17. The plate also includes openings 106 extending through a thickness of the plate 104. The openings 106 may be circular or other shapes, including a variety of polygonal shapes or slots extending about the plate. As illustrated in FIG. 3, the plate includes round openings 106 that may be punched or drilled through the plate 104.

According to an aspect, the catalyst-side partition 105 includes a profile wire screen 108. U.S. Pat. Nos. 2,046,458 and 4,276,265, which are incorporated by reference herein disclose typical structures and methods of making profile wire screens. The profile wire screen 108 includes a plurality of generally vertically oriented and horizontally spaced profile wires 110 and a plurality of generally horizontally oriented and vertically spaced support members 112 extending across the profile wires 110. The support members 112 extend generally orthogonally from the profile wires 110 and are coupled thereto at one end portion 114 thereof. It should be understood that for ease of description herein, terms such as horizontal and vertical are used to describe the partitions 102 and 104 on a standalone basis as illustrated in FIG. 3. However, it should be understood that when the partitions are formed for being used in the reactor 10 or are positioned within the annular reactor 10, horizontal may refer to circumferential or radial, while vertical may refer to axial. For example, when situated within a reactor, the profile wires 110 will be generally axially oriented and circumferentially spaced about the center axis 17 of the reactor 10. Similarly, the orthogonally extending support members 112 may extend radially inward or outward depending on the configuration of the reactor.

By one aspect, the support members 112 include support rods 114. The support rods 114 may be coupled at an opposite edge portions 115 and 116 between the profile wires 110 and the plate 104. The profile wires 110 and support rods 114 form openings or slots 124 through the profile wire screen 108 where they intersect. By one aspect, the edge portions 116 of adjacent support members are vertically aligned above and below the openings 106 of the plate 104. In this manner an upper surface 118 of a lower support member and a lower surface 120 of an adjacent upper support member form a fluid channel 122 in fluid communication with the plate opening 106 and the slot 124. In this manner a plurality of fluid flow channels 122 are formed vertically along the apparatus 100 to define fluid flow paths for the flow of fluid through the apparatus or partition 100, for example centerpipe 30.

By one aspect, a baffle 126 extends into the fluid flow path to obstruct or interrupt at least a portion of the flow of fluid therethrough. In one example, the baffle 126 extends into one of an upper portion 128 or a lower portion 130 of the fluid flow path or channel 12 that is distal from the inlet 32 of the reactor 10. That is, for example where the inlet 32 is at a bottom portion of the reactor as illustrated in FIG. 1, the baffle extends into upper portion of the opening 106 or channel 12. In another example, the baffle 126 extends into one of the upper portion 128 or lower portion 130 of the fluid flow path or channel that is distal from the direction from where the fluid is flowing flows. That is, with regard to FIG. 3, where the fluid travels vertically upward along the plate 104, the baffle 126 extends into an upper portion 128 of the fluid flow path or channel 122 to obstruct an upper portion of the channel 122 and/or opening 106 as illustrated in FIG. 3. On the other hand, where the fluid travels vertically downward along the plate 104, the baffle 126 extends into a lower portion 130 of the fluid flow path or channel 122 to obstruct a lower portion of the channel 122 and/or opening 106. Surprisingly, it has been identified that by positioning a baffle within the flow channel in this manner, fluid jetting can be reduced and a more even fluid velocity profile within the channel 122 and along the profile wires 108 can be achieved to reduce localized peak velocities that cause vibration and erosion and corrosion of the profile wires screen 108 and/or the catalyst.

Where this description describes the baffle obstructing an upper or lower portion of an opening or channel, this includes the baffle obstructing the opening alone or in combination with another component, such as the support rod 114. For example, as illustrated in FIG. 4, the support rod 114 and baffle 126 both partially obstruct the opening 106.

By one example, the baffle extends into to flow path to obstruct between about an upper 5 and 70% of the opening 106 and/or channel 122. By another example, the baffle 126 extends into the flow path to obstruct between about an upper 10 and 50% of the opening 106 and/or channel 122. By yet another example, the baffle 126 extends into the flow path to obstruct between about an upper 20 and 30% of the opening 106 and/or channel 122. In these examples the baffle may obstruct between about 75 and about 100% of the width of the openings in one example and between about 85 and about 100% of the width of the openings in another example.

By one example, the opening has an opening height between about 10 and about 25 mm. In another example the opening has an opening height of between about 11 and about 21 mm. In yet another example, the opening has a height of between about 11 and about 13 mm. In one example, the baffle obstructs between about an upper or lower 2 and 10 mm of the opening height. In another example the baffle obstructs about an upper or lower 3 and 7 mm of the opening height. In one example, the support rod 114 has a thickness of between about 2 and about 10 mm and the baffle extends vertically from the support rod by between about 1 and about 5 mm and in another example from between about 2 and about 4 mm.

By one aspect, as illustrated in FIGS. 3 and 4, the baffle 126 is coupled to the support member and extends vertically therefrom into one of the upper and lower portions of the fluid flow channel 122. In the illustrated example, the baffle 126 extends down from an end portion 116 of the support rod 112, generally adjacent to the plate 106. In another example the baffle may extend into the opening 106 itself. In yet another example the baffle extends down from the support member 114 at a distance away from the plate 104 and between the plate 104 and profile wires 110. By one example, a front face 130 of the baffle 126 is positioned between being adjacent to the plate 104 to being about 50% of the distance between the plate 104 and the profile wires 110. By another example, a front face 130 of the baffle 126 is positioned between being adjacent to the plate 104 to being about 30% of the distance between the plate and the profile wires 110. In one example, the front face 130 of the baffle 126 is positioned between about 10 and about 50% of a distance between a fluid-side face 132 of the plate and the profile wires 110. By another example, the front face 130 of the baffle is positioned between about 20 and about 35% and in another example between about 25 and about 30% of a distance between a fluid-side face 132 of the plate and the profile wires 110. In another example a baffle offset distance (distance between the fluid-side face 132 of the plate and the front face 130 of the baffle) to opening height ratio is between about 0.5 and about 1.5 and in another example is between about 0.75 and about 1. Surprisingly, it has been found that having the baffle front face 130 offset from the fluid-side face 132 of the plate improves the flow characteristics, decreases localized peak velocities, and reduces corrosion and erosion versus having the baffle aligned with or very close to the front face of the plate or simply decreasing the size of openings 106 in the plate.

Figure 5:
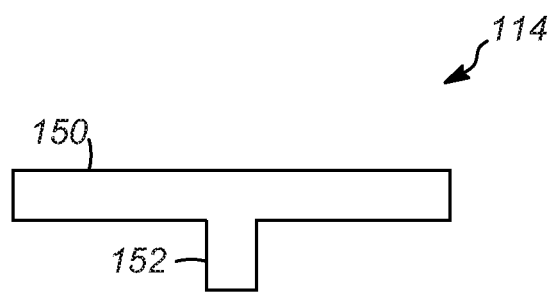
FIG. 5 illustrates a plate for use within a radial flow reactor in accordance with various embodiments.

By one aspect the baffle is coupled to support rods 112 and extends therefrom. The baffle 126 may extend generally orthogonally from the support rods 112. According to one aspect, as illustrated in FIGS. 3-4, the support rods 112 have an L-shaped cross section with one leg of the support rod 112 extending generally orthogonally from the profile wire screen to form a main portion 134 of the support rod and the other leg of the support rod providing the baffle 126 that extends down from the support rod 114. In this manner, the baffle 126 may be generally adjacent to the plate 104. According to another aspect, as illustrated in FIG. 5, the support rod 112 may have a T-shaped cross section having a main portion 150 for coupling to and extending orthogonally from the profile wires 110 and a baffle portion 152 extending from the main portion 150 and generally parallel to the profile wires 110 to provide the baffle 126. In this manner, the baffle 126 may be offset from the plate 104. According to either of the aspects discussed above, the support rod 114 may be formed in any known manner, including welding or bending of the rod to form the L-shape or T-shape thereof.

Figure 6:
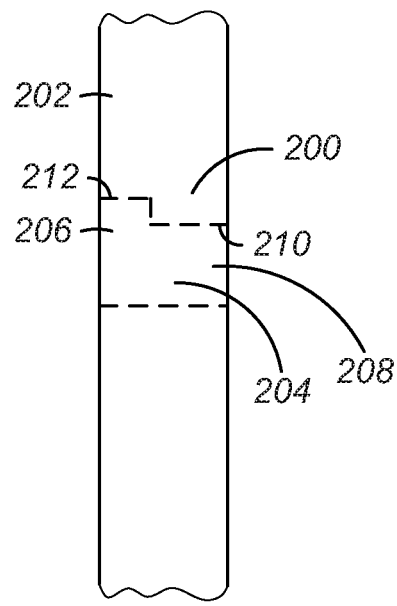
FIG. 6 illustrates an alternative plate for use within a radial flow reactor in accordance with various embodiments.

By another aspect, as illustrated in FIG. 6, the baffle 200 is integral with a plate 202 itself. The baffle 200 may be provided alternatively to or in addition to another baffle extending from the support rod 114. In this manner the baffle 200 extends partially into the opening 204. According to this aspect, the plate includes a first partial opening 206 that extends from a fluid-side face of the plate through a portion of a thickness of the plate 202. The plate includes a second partial opening 208 that extends through another portion of the thickness of the plate to an opposite face of the plate. The first and second openings intersect to form the opening 204 extending through the entire thickness of the plate 202. An upper surface or edge portion 210 of the second partial opening 208 is vertically offset below an upper surface or edge portion 212 of the first partial opening 206. In this manner, a portion of the plate material above the second opening edge portion 210 provides the baffle 200 for obstructing or interrupting at least a portion of the flow of fluid therethrough. According to another aspect, the plate 202 may include two partial plates that are joined together such as by laminating. The partial openings 206 and 208 may be openings through the partial plates and the plate may be formed by aligning the plates so that the upper edge portion 210 of the second partial opening of the second partial plate is below the first partial opening 206 upper edge portion 212 of the first partial plate. In this manner, the baffle 200 includes the material of the second partial plate above the second partial opening upper edge portion 210. It should be understood that where it is desired to obstruct a lower portion of the opening 204 or flow channel 122, an opposite configuration is also contemplated herein so that baffle 200 is at a bottom portion of the opening 204.

In accordance with one aspect, a method is provided for forming an apparatus for retaining solid particles in a reactor. The method includes providing a profile wire screen having a plurality of generally parallel spaced wires supported by a plurality of generally parallel elongate support rods coupled at one edge portion thereof to the profile wires. The support rods may extend generally orthogonally from the profile wires to define openings where the profile wires and support rods intersect. The method further includes forming baffles coupled to and extending from the support rods. The method also includes providing a plate having a plurality of openings. The openings may be formed, for example, by drilling, milling, or punching the plate.

The method according to an aspect includes arranging the support rods to extend between the profile wires and the plate, with the plate generally parallel to the support wires to that adjacent support rods define a flow channel in fluid communication with a plate opening and a profile wire screen opening. In this manner, an upper support rod defines an upper surface of the flow channel and an adjacent lower support rod defines a lower surface of the flow channel. The method further includes positioning at least a portion of the baffle to obstruct one of an upper and lower portion of the flow channel so that fluid flowing therethrough will be at least partially obstructed by the baffle portion. The method also includes connecting the support rods between the profile wires and the plate to form the partition or apparatus. Forming the baffles, according to an aspect, includes bending an edge portion of the support rods downward to form a generally L-shaped cross section of the support rods with the baffle including one leg of the L-shaped cross section. On the other hand, other methods can be used to form a baffle extending from the support rod, including, but not limited to attaching a baffle to the support rod through welding or other means, and the baffle may be formed intermediate edge portions of the support rod, to provide a support rod with a generally T-shaped cross section.

By one aspect the baffle may be formed to extend down from the support rod and aligned to obstruct an upper portion of the plate opening when coupled thereto.

According to another aspect, a method of forming an apparatus or partition as generally described herein includes arranging a plurality of elongate support rods having one of a T-shaped and L-shaped cross section generally parallel to one another to define vertices of an imaginary polygon. The method may include aligning the support rods so that one portion or leg thereof extends generally radially inwardly with regard to a profile wire screen cylinder that will be formed, and the other leg of the L-shaped support rod or the bottom of the T-shaped support rod extends generally tangential to the cylinder. The method includes helically winding a profile wire about the support rods down the lengths thereof along an edge portion of the support rods. Each coil is spaced from adjacent coils and joined to the support rods. In this manner a generally cylindrical profile wire screen is formed. The method further includes cutting the profile wire between two of the support rods and generally parallel thereto and opening the profile wire screen. The profile wire screen may be flattened and positioned so that the profile wires extend generally vertically and the other leg of the L-shaped support rod or a bottom portion of the T-shaped support rod extends generally parallel to the profile wires to form a baffle.

According to this aspect, the method may also include providing a plate as described above having a plurality of openings extending therethrough. The method also includes arranging the profile wire screen and the plate so that the baffles vertically away from the support rod to partially block an upper or lower portion of the opening. The formed partition may then be formed into a generally cylindrical shape to be positioned within a reactor. For example, a plurality of such partitions may be formed and positioned side-by-side in an arcuate arrangement or one or more partitions may be curved to form the generally cylindrical partition.

According to yet another aspect, a method of making a partition for retaining a solid in a radial flow reactor includes providing a plate having a thickness and forming a partial opening on one side of the plate through a first portion of the plate thickness. The formed first opening includes an upper edge portion or surface at a first vertical height. The method includes forming a second partial opening on an opposite side of the plate through a second portion of the plate thickness having a second upper surface below the first upper surface so that the first and second openings intersect to form a complete opening through which fluid may flow. The portion of the plate above the second upper surface forms a baffle to obstruct an upper portion of the first opening. Alternatively the above method could be carried out, however to form the baffle at a lower portion of the first opening, as should be readily understood. By one aspect, the method includes forming the first and second partial openings by removing plate material from one side of the plate through the first portion of the thickness thereof and removing plate material from the other side of the plate through the second portion of the thickness. In another aspect, the second opening is formed by forming a smaller opening through the second portion of the plate material by removing material through the first opening. By yet another aspect, first and second partial openings may be formed in a plurality of partial plates and the partial plates can be aligned to form the baffle and joined together, such as through laminating the partial plates together.

While this description has been provided with regard to specific embodiments, it is to be understood that this description should not be limiting to the disclosed embodiments, but it is intended to cover various modifications and equivalent arrangements included within the scope of the appended claims.

The invention claimed is:

1. An apparatus for retaining a solid in a reactor comprising:

a generally vertical fluid side partition having a fluid side opening to allow passage of the fluid therethrough;

a generally vertical solid side partition spaced radially from the fluid side partition and generally parallel thereto having a solid side opening to allow passage of fluid therethrough;

a fluid flowpath between the fluid side opening and the solid side opening; and a baffle extending into the fluid flowpath to obstruct an upper portion of the fluid side opening and partially interrupt the flow of fluid along the fluid flowpath.

2. The apparatus of claim 1, further comprising a first support member coupled between the fluid side partition and the solid side partition with an end portion positioned generally above the fluid side opening and a second support member coupled between the fluid side partition and the solid side partition with an end portion positioned generally below the fluid side opening to define a fluid flow channel therebetween in fluid communication with the fluid side and solid side openings and wherein the baffle depends from the first support member into an upper portion of the fluid flow channel to interrupt the flow of fluid therethrough.

3. The apparatus of claim 2, wherein the baffle is attached to the first support member.

4. The apparatus of claim 2, wherein the first support member is an L-shaped support rod and the baffle comprises one leg of the L-shaped support rod.

5. The apparatus of claim 1, wherein the baffle extends downward to obstruct between about an upper 5% and an upper 70% of the fluid side opening.

6. The apparatus of claim 1, wherein the baffle is positioned between about being adjacent to the fluid side partition to about half way between the fluid side partition and the solid side partition.

7. The apparatus of claim 1, wherein the fluid side opening has a height of between about 10 and about 25 mm and the baffle obstructs between about 2 and about 10 mm of the upper portion of the fluid side opening.

8. The apparatus of claim 1, wherein the solid side partition comprises a profile wire screen and the fluid side partition comprises a perforated plate.

9. The apparatus of claim 1, wherein the fluid side partition comprises a plate having a thickness and the fluid side opening includes a first partial opening on one side of the plate extending partially through the thickness of the plate with an upper first opening edge portion at a first height and a second partial opening on an opposite side of the plate intersecting the first partial opening to provide the fluid side opening extending through the entire plate thickness and having an upper second opening edge portion at a second lower height than the first height so that the baffle includes the upper second opening edge portion.

10. An apparatus for retaining a solid in a reactor comprising:

a profile wire screen including a plurality of generally vertically aligned and horizontally spaced profile wires and first and second vertically spaced support rods extending generally horizontally thereacross and coupled at one edge portion to and extending orthogonally from the plurality of profile wires to define a screen opening through the profile wire screen;

a plate spaced from the plurality of profile wires and coupled to an opposite edge portions of the first and second support rods;

a plate opening of the plate generally below the first support rod edge portion and above the second support rod edge portion;

a lower surface of the first support rod and an upper surface of the second support rod defining a fluid flow channel in fluid communication with the plate opening and the screen opening to allow fluid to flow therethrough; and a baffle extending downward into the fluid flow channel to obstruct an upper portion of the plate opening to partially interrupt the flow of fluid therethrough.

11. A radial flow reactor for contacting a fluid with a solid material comprising:

a centerpipe for receiving fluid flowing in a fluid flow direction;

an inlet in communication with the centerpipe for providing the fluid thereto;

an annular bed of solid material surrounding the centerpipe for contacting the fluid;

a permeable annular partition surrounding the bed of solid particles for supporting the bed of solid material;

a reactor wall spaced from and surrounding the annular partition to define a fluid exit space therebetween;

an outlet in fluid communication with the fluid exit space for removal of fluid from the fluid exit space;

an outer profile wire screen of the centerpipe with a plurality of generally vertically aligned and circumferentially spaced profile wires for restricting the solid material from entering the centerpipe;

first and second vertically spaced support rods of the profile wire screen extending generally circumferentially across the profile wires and coupled at one edge portion thereof to the profile wire screen and extending radially inwardly therefrom;

an annular plate of the centerpipe having a plate opening generally below the first support rod and above the second support rod with an outer surface thereof coupled to an opposite edge portion of the first and second support rods;

a lower surface of the first support rod and an upper surface of the second support rod defining a fluid flow channel in fluid communication with the plate opening and the screen opening to allow fluid from the centerpipe to flow therethrough and into the bed of solid material; and a baffle extending into the fluid flow channel to obstruct one of an upper and lower portion of the plate opening that is opposite the fluid inlet.

* * * * *